United States Patent [19]
Yoshimoto et al.

[11] Patent Number: 5,506,995
[45] Date of Patent: Apr. 9, 1996

[54] BUS MASTER FOR SELECTIVELY DISCONNECTING/CONNECTING A FIRST BUS TO AND FROM A SECOND BUS IN RESPONSE TO AN ACQUISITION REQUEST

[75] Inventors: Tadashi Yoshimoto; Shinichiro Chino, both of Hyogo, Japan

[73] Assignee: Mitsubishi Denki Kabushiki Kaisha, Tokyo, Japan

[21] Appl. No.: 63,971

[22] Filed: May 20, 1993

[30] Foreign Application Priority Data

Jun. 8, 1992 [JP] Japan .................................. 4-171546
Oct. 13, 1992 [JP] Japan .................................. 4-299173

[51] Int. Cl.$^6$ .................................................. G06F 13/14
[52] U.S. Cl. ........................ 395/800; 395/250; 395/287; 364/132; 364/229.2; 364/230.1; 364/DIG. 1; 364/242.6
[58] Field of Search .................................. 395/800, 250, 395/325, 275; 364/DIG. 1, 132, 229.2, 230.1, 242.6, DIG.1

[56] References Cited

U.S. PATENT DOCUMENTS

| | | | |
|---|---|---|---|
| 3,864,670 | 2/1975 | Inoue et al. | 395/575 |
| 4,257,095 | 3/1981 | Nadir | 395/325 |
| 4,490,788 | 12/1984 | Rasmussen | 395/275 |
| 4,610,013 | 9/1986 | Long et al. | 395/275 |
| 4,807,109 | 2/1989 | Farrell et al. | 395/325 |
| 4,860,191 | 8/1989 | Nomura et al. | 395/200 |
| 4,912,633 | 3/1990 | Schweizer et al. | 395/800 |
| 4,930,069 | 5/1990 | Batra et al. | 395/275 |
| 4,987,529 | 1/1991 | Craft et al. | 395/325 |
| 5,003,465 | 3/1991 | Chisholm et al. | 395/275 |
| 5,043,877 | 8/1991 | Berger et al. | 395/325 |
| 5,067,071 | 11/1991 | Schanin et al. | 395/275 |
| 5,170,481 | 12/1992 | Begun et al. | 395/725 |
| 5,369,748 | 11/1994 | McFarland et al. | 395/325 |

FOREIGN PATENT DOCUMENTS 2-50750   2/1990   Japan .

*Primary Examiner*—Alyssa H. Bowler
*Assistant Examiner*—Dzung C. Nguyen
*Attorney, Agent, or Firm*—Burns, Doane, Swecker & Mathis

[57] ABSTRACT

A computer system having a bus connection and disconnection unit for connecting and disconnecting an ISA bus to and from a slave bus, the ISA bus being connected to a main processor. The slave bus is connected with a bus master. When accessing a device on the slave bus, the bus master requests the bus connection and disconnection unit to disconnect ISA bus from the slave bus. This allows the main processor to perform other processing without getting put on hold.

10 Claims, 10 Drawing Sheets

BUS MASTER FOR SELECTIVELY DISCONNECTING/CONNECTING A FIRST BUS TO AND FROM A SECOND BUS IN RESPONSE TO AN ACQUISITION REQUEST

BACKGROUND OF THE INVENTION

1. Field of the Invention

The present invention relates to a computer system comprising a processor (CPU) and a bus connection and disconnection function for connecting and disconnecting two buses which are each able to have a bus master.

2. Description of the Prior Art

One of the widely accepted multiple bus master configurations for computer systems is that of the IBM PC/AT, known as the industrial standard architecture (ISA). FIG. 9 is a block diagram showing major components of a conventional computer system that utilizes an ISA multiple bus master configuration. In FIG. 9, reference numeral 101 is a CPU block of the ISA system; 1011 is a CPU; 1012 is a DMA controller; 1013 is a buffer that connects a local bus 1014 of the CPU 1011 with an extended bus (ISA bus) 106 of the ISA system; 1015 is a hold request signal sent by the DMA controller 1012 to the CPU 1011; and 1016 is a hold acknowledge signal returned by the CPU 1011 to the DMA controller 1012. Reference numeral 102 is a request signal DRQx sent from a bus master 107 to the DMA controller 1012, and 103 is an acknowledge signal $\overline{DACKx}$ returned by the DMA controller 1012 to the bus master 107. With this kind of ISA system, the request signal DRQx 102 generated by the bus master 107 always causes the DMA controller to hold the CPU 1011 before the controller generates the acknowledge signal $\overline{DACKx}$ 103 that allows the bus master 107 to acquire the bus.

FIG. 10 is a block diagram of a typical prior art bus master. In FIG. 10, reference numeral 301 is a master device that may act as the bus master; 302 is a system interface that interfaces the master device 301 to the system; and 303 is a data buffer provided between a local data bus 307 for the master device and a data bus 313 for the system. Reference numeral 304 is a local address bus for the master device; 305 is a command signal from the master device; 306 is a ready signal to the master device; 308 is an address bus for the system; 309 is a bus acquisition request signal to the system; 310 is a bus acquisition acknowledge signal from the system; 311 is a command signal to the system; 312 is a ready signal from the system; and 314 is a data buffer control signal.

FIG. 11 is a block diagram of the system interface 302 used by the conventional bus master 107. In FIG. 11, reference numeral 320 is a decoding circuit; 321 is a control circuit that generates a control signal; 322 is an interface buffer control circuit; 323a, 323b, etc. are window registers for transferring data from the master device to the system; 324a, 324b, etc. are bank addresses from the window registers 323a, 323b, etc.; 325 is an effective window selection signal; 326 is a multiplexer for effective window selection; 327 is the bank address of the selected window; 328 is an address buffer control signal; 329 is an address buffer; and 330 is a bus acquisition notice signal.

The conventional computer system of the above configuration works as follows. The bus master 107 has within its address space a number of windows for access to the system. The bank addresses of these windows are programmed beforehand in the window registers 323a, 323b, etc. When the master device 301 generates a signal for access to any one of the windows, the decoding circuit 320 decodes the access signal and generates the bus acquisition request signal 309 and window selection signal 325 accordingly. Depending on the content of the window selection signal 325, the multiplexer 326 selects one of the bank addresses 324a, 324b, etc. and outputs the selected bank address 327. Upon receipt of the bus acquisition request signal 309 from the decoding circuit 320, the control circuit 321 turns the ready signal 306 inactive to cause the master device 301 to wait for an access.

When the system allows the bus master 107 to acquire the bus and outputs the bus acquisition acknowledge signal 310 to the latter, the control circuit 321 suitably times the generation of the bus acquisition notice signal 330 and command signal 311. This causes the master device 301 to be accessed on the extended bus of the system. When the device to be accessed is ready to respond, the control circuit 321 receives the ready signal 312 from the system and outputs the ready signal 306 to the master device 301. The interface buffer control circuit 322 controls the data buffer 303 and address buffer 329 in accordance with the command signal 305 from the master device and with the bus acquisition notice signal 330. At the end of the access, the decoding circuit 320 stops outputting the bus acquisition request signal 309. This causes the bus master 107 to release the extended bus of the system and returns control of the extended bus to the system.

FIG. 12 is a block diagram of a prior art bus connection and disconnection device for connecting and disconnecting a slave bus to and from the ISA system. In FIG. 12, reference numeral 1 is a high-order byte data bus constituting part of an ISA bus as a master bus (MBUS); 2 is a low-order byte data bus constituting part of the ISA bus; 3 is an address bus also constituting part of the ISA bus; 4 is a device data width identification signal for use on the ISA bus; 5 is a ready signal for use on the ISA bus; 6 is a command signal for use on the ISA bus; 7 is a high-order byte data bus constituting part of a CPU local bus for the ISA system; and 8 is a low-order byte data bus also constituting part of the CPU local bus.

Reference numeral 11 is a high-order byte data buffer that connects the high-order byte data bus 7 (CPU local bus) with the high-order byte data bus 1 (ISA bus); 12 is a low-order byte data buffer that connects the low-order byte data bus 8 (CPU local bus) with the low-order byte data bus 2 (ISA bus); and 13 is a data swap buffer that swaps data between high-order byte data bus 1 and low-order byte data bus 2. The high-order byte data bus 7, low-order byte data bus 8, high-order byte data buffer 11, low-order byte data buffer 12 and data swap buffer 13 are all included in the CPU block 101 of FIG. 9.

Further in FIG. 12, reference numeral 21 is a high-order byte data bus constituting part of the subordinate bus (SBUS); 22 is a low-order byte data bus constituting part of the subordinate bus; 23 is an address bus also constituting part of the subordinate bus; 24 is a device data width identification signal for use on the subordinate bus; 25 is a ready signal for use on the subordinate bus; 26 is a command signal for use on the subordinate bus; 31 is a high-order byte data buffer that connects the high-order byte data bus 1 (ISA bus) with the high-order byte data bus 21; 32 is a low-order byte data buffer that connects the low-order byte data bus 2 (ISA bus) with the low-order byte data bus 22; and 33 is an address buffer that connects the address bus 3 (ISA bus) with the address bus 23.

Reference numeral 34 is a device data width identification signal conversion circuit that converts the device data width identification signal 24 of the SBUS into the device data width identification signal 4 of the ISA bus; 35 is a ready signal conversion circuit that converts the ready signal 25 of SBUS into the ready signal 5 of the ISA bus; and 36 is a command signal conversion circuit that converts the command signal 6 of the ISA bus into the command signal 26 of the SBUS. Reference numeral 37 is a buffer control circuit that controls the high-order byte data buffer 31 and the low-order byte data buffer 32 in accordance with the address data from the address bus 3 (ISA bus) and with the device data width identification signal 24 and command signal 26 of the SBUS. Reference numeral 38 is a control signal generated by the buffer control circuit 37 for control over the high-order byte data buffer 31 and low-order byte data buffer 32.

The bus connection and disconnection device of the above constitution works as follows. For access to a device on the ISA bus, the ISA system uses the high-order byte data buffer 11, low-order byte data buffer 12 and data swap buffer 13 to access the device that may be either an 8-bit or a 16-bit data width type. Access to the 8-bit device is achieved through the low-order byte data bus 2 (ISA bus) regardless of the access data width or access address. Of the one-time word access cycles generated on the CPU local bus, any one cycle for access to an 8-bit device on the ISA bus is converted to two low-order byte access cycles on the ISA bus before execution.

Where a device on the SBUS connected to the ISA bus is to be accessed, the start of an access cycle on the ISA bus is paralleled by the output of an address signal and a command signal to the SBUS through the address buffer 33 and command signal conversion circuit 36. In response to these signals, the device to be accessed on the SBUS generates the device data width identification signal 24 and ready signal 25. The signals 24 and 25 are converted by the device data width identification signal conversion circuit 34 and ready signal conversion circuit 35 before being sent back to the ISA system. On receiving the returned device data width identification signal 4 and ready signal 5, the ISA system utilizes an effective data byte bus for access. At this point, the buffer control circuit 37 toggles the high-order byte data buffer 31 and low-order byte data buffer 32 to connect the effective data byte bus on the ISA bus side with the SBUS for data transmission.

Another prior art bus connection and disconnection device is disclosed illustratively in Japanese Patent Laid-Open No. HEI/2-50750. The disclosed device comprises a bus conversion starting circuit that detects word access by a 16-bit CPU to an even-number address of 8-bit bus channels; a machine cycle counter that counts CPU clock pulses after getting started by the bus conversion starting circuit; a wait circuit that generates a wait signal for the CPU in response to the output from the machine cycle counter; and a pseudo cycle generation circuit that generates two virtual bus cycles to the 8-bit bus channel determined by the output from the machine cycle counter. One of the disadvantages of the above bus connection and disconnection device is that any device on the SBUS connected to the ISA bus must be an 8-bit type device when accessed by the ISA system.

With prior art ISA computer systems, as described, the CPU must always be put on hold whenever any device on the ISA bus is to be accessed by the multi-bus master. This is an impediment to drawing out the full performance of the system. In a bus connection and disconnection setup, the target device on the SBUS needs to generate the device data width identification signal 4 for the ISA bus in accordance with its bit width. It is impossible to access, on the SBUS, any device whose device data width identification signal 24 fails to coincide in activation timing with the ISA system. Because devices on the SBUS need to respond instantaneously to the access from the ISA system, no bus master can be furnished on the SBUS. Furthermore, the lack of a disconnection request function in the bus master makes it impossible to make full use of the bus disconnection capability of the system. That is, once the bus is acquired, the CPU is always put on hold.

SUMMARY OF THE INVENTION

It is therefore an object of the present invention to overcome the above-described drawbacks and disadvantages of the prior art and to provide a computer system in which a bus master is capable of acquiring a bus without putting the main processor on hold.

In carrying out the invention, there is provided a computer system comprising: a processor for executing processes constituting principal operations of the computer system; a first bus connected to the processor; a first bus master for executing predetermined processes; a second bus connected to the first bus master; bus connection and disconnection means for connecting and disconnecting the first bus to and from the second bus; and bus connection and disconnection control means for causing the bus connection and disconnection means to disconnect the first bus from the second bus when the first bus master requests acquisition of the second bus.

When the first bus master is to acquire the second bus, the first bus master requires the bus connection and disconnection means to disconnect the first bus from the second bus. When the first bus is disconnected from the second bus, the main processor proceeds to carry out other processing without getting put on hold.

These and other objects, features and advantages of the invention will become more apparent upon a reading of the following description and appended drawings.

DETAILED DESCRIPTION OF THE PREFERRED EMBODIMENTS

Preferred embodiments of the invention will now be described with reference to the accompanying drawings.

First Embodiment

Figure 1:
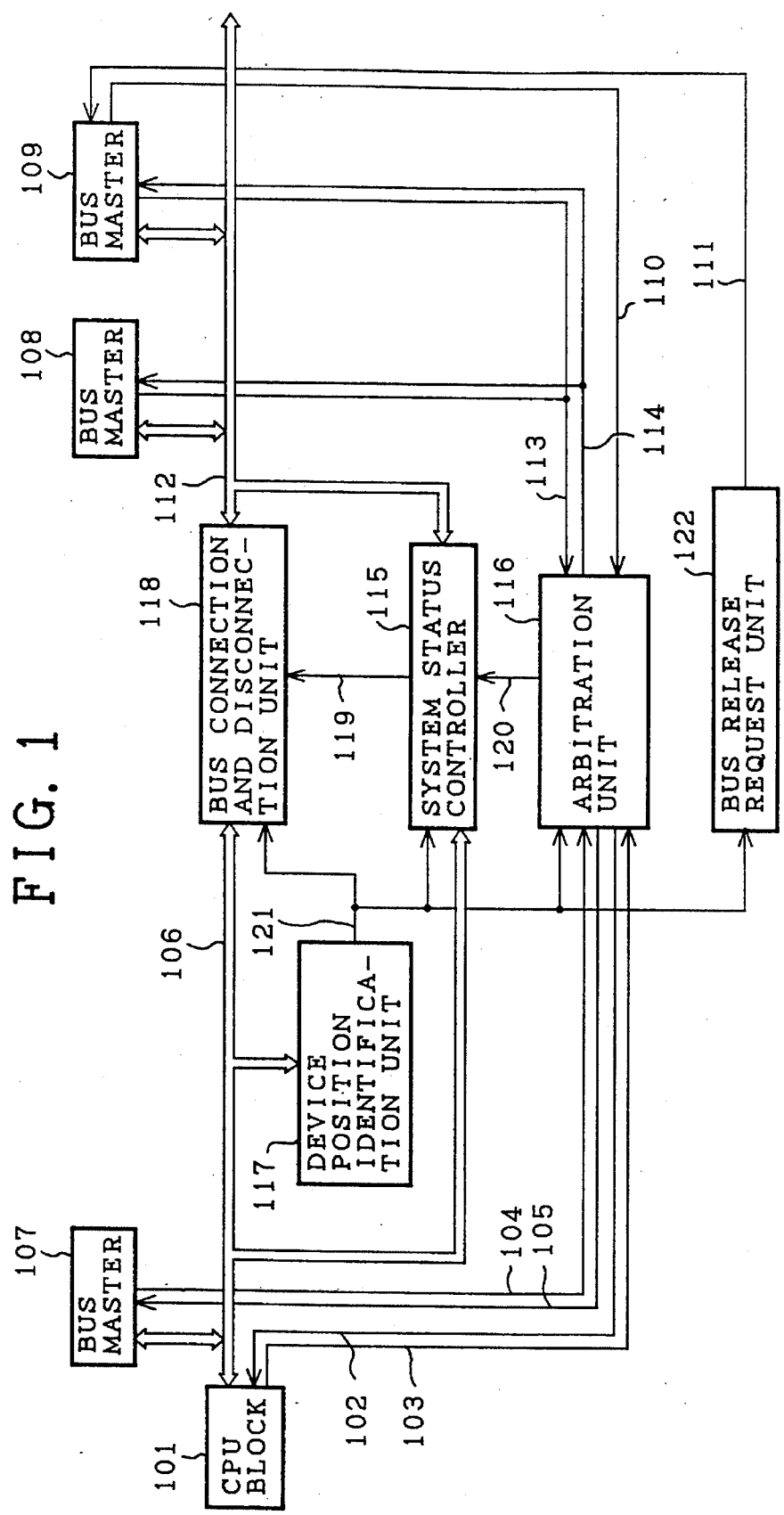
FIG. 1 is a block diagram of a computer system practiced as a first embodiment of the invention.

FIG. 1 is a block diagram of a computer system practiced as the first embodiment of the invention. The computer system of FIG. 1 is an ISA (industrial standard architecture) system comprising an ISA bus as its main bus (MBUS). In FIG. 1, reference numeral 101 is a CPU block made primarily of a DMA controller and an ISA bus driving buffer; 102 is a hold request signal DRQx (ISADRQx) sent to the CPU block 101 from an arbitration unit 116, to be described later; 103 is a hold acknowledge signal $\overline{\text{DACKx}}$ ($\overline{\text{ISADACKx}}$) sent from the CPU block 101 to the arbitration unit 116; 104 is a bus acquisition request signal DRQx (MDRQx) output by a bus master 107 on the ISA bus; 105 is a bus acquisition acknowledge signal $\overline{\text{DACKx}}$ ($\overline{\text{MDACKx}}$) sent to the bus master 107 on the ISA bus; 106 is an ISA bus signal other than the DRQx 104 and $\overline{\text{DACKx}}$ 105; 108 is a general-purpose bus master on a subordinate bus (SBUS); 109 is a bus master that implements the features of this computer system; 110 is a bus disconnection request signal output by the bus master 109; 111 is a bus release request signal sent to the bus master 109; 112 is the SBUS; 113 is a bus acquisition request signal on the SBUS 112; and 114 is a bus acquisition acknowledge signal on the SBUS 112.

Reference numeral 115 is a system status controller that controls system status transitions; 116 is an arbitration unit that supports disconnection of the ISA bus (MBUS) from the SBUS 112 through arbitration of the right to bus usage; 117 is a device position identification unit which, storing the addresses of all devices on the ISA bus 106 and SBUS 112, ascertains whether the device to be accessed is located on the ISA bus 106 or on the SBUS 112 through comparison of the stored addresses with the actual address of the device on the bus; 118 is a bus connection and disconnection unit that connects and disconnects the ISA bus 106 to and from the SBUS 112 under control of the system status controller 115; 119 is a system status signal sent from the system status controller 115 to the bus connection and disconnection unit 118; 120 is a bus disconnection request signal sent from the arbitration unit 116 to the system status controller 115; 121 is a SBUS access occurrence signal indicating that the current access on the ISA bus 106 is related to a device on the SBUS 112; and 122 is a bus release request unit that outputs the bus release request signal 111 upon detecting the SBUS access occurrence signal 121. The bus master 109 connects the bus disconnection request signal 110 or bus release request signal 111 in order to implement the bus disconnection and bus release request features of the computer system.

Below is a description of how the computer system of the above-described constitution works. First, the buses are disconnected as follows. The arbitration unit 116 receives a bus disconnection request signal 110 of a certain level from the bus master 109 as well as a bus acquisition request signal 113 of the same level. When the arbitration unit 116 permits bus acquisition in response to the bus acquisition request signal 113, the arbitration unit 116 returns the bus acquisition acknowledge signal 114 to the bus master 109. At the same time, the arbitration unit 116 outputs the bus disconnection request signal 120 to the system status controller 115. Upon receipt of the bus disconnection request signal 120, the system status controller 115 places the system in a bus disconnection state and supplies the bus connection and disconnection unit 118 with the system status signal 119 indicating the bus disconnection state. On receiving the system status signal 119, the bus connection and disconnection unit 118 disconnects the ISA bus 106 (MBUS) from the SBUS 112.

Where the CPU block 101 or bus master 107 is to access a device on the SBUS 112 while the two buses are being disconnected, the computer system works as follows. The device position identification unit 117 keeps detecting access cycles on the ISA bus 106. When an access cycle for access to the device on the SBUS 112 is generated on the ISA bus 106, the device position identification unit 117 outputs the SBUS access occurrence signal 121. In turn, the bus connection and disconnection unit 118 causes the access cycle to wait and the bus release request unit 122 outputs the bus release request signal 111. If there is no need for bus acquisition or if the bus release request signal 111 is received, the bus master 109 renders the bus disconnection request signal 110 and bus acquisition request signal 113 inactive to release the SBUS 112. With the SBUS 112 released, the arbitration unit 116 turns the bus disconnection request signal 120 inactive. The system status controller 115 changes a system state into a state in which the system is able to execute on the SBUS 112 the access cycle being placed in wait state on the ISA bus 106. Upon receipt of the system status signal 119, the bus connection and disconnection unit 118 connects the ISA bus 106 with the SBUS 112. Thereafter, the access cycle in the wait state is executed on the ISA bus 106. When the device is ready to respond, the wait state is released so that the ready signal on the SBUS 112 is output onto the ISA bus 106.

The buses are accessed as follows. If the CPU block 101 or the bus master 107 has acquired the ISA bus 106 and if the ISA bus 106 remains connected to the SBUS 112, the CPU block 101 or the bus master 107 having the bus connection may freely gain access to any device on the ISA bus 106 or on the SBUS 112. Suppose that the bus master 109 requests bus disconnection and has acquired the SBUS 112, the bus connection and disconnection unit 118 disconnects the two buses. In that case, even as the bus master 109 is accessing a device on the SBUS 112, the CPU block 101 or the bus master 107 on the ISA bus 106 may gain access to a device on the ISA bus. This arrangement allows a plurality of bus masters to perform parallel bus access. When the bus master 108 on the SBUS 112 or the bus master 109 having issued no bus disconnection request acquires the bus connection, the bus connection and disconnection unit 118 connects the two buses. Therefore the bus master having the bus connection may freely gain access to any device on the SBUS 112 or on the ISA bus 106.

What follows is a description of how the device position identification unit 117 works. For the device position identification unit 117 to work properly requires that a user should program in advance the address spaces of memories and I/O ports for all devices on the ISA bus 106 into the device position registers inside the unit 117. Where a predetermined area always exists in an address space to be programmed, that area may be allocated on a hardware basis. The device position identification unit 117 continues to detect address and command signals over the ISA bus 106. In doing so, the device position identification unit 117 compares the access cycle occurring on the ISA bus 106 with the programmed address spaces. If the access cycle occurring on the ISA bus 106 is found to be directed to a device on the SBUS 112, the device position identification unit 117 generates the SBUS access occurrence signal 121.

Below is a description of how the system status controller 115 works. The system status controller 115 will be described in connection with the system states when the buses are connected or disconnected. The system status controller 115 receives signals from the ISA bus 106 and SBUS 112, the bus disconnection request signal 120 from the arbitration unit 116 and the SBUS access occurrence signal 121 from the device position identification unit 117; in turn, the controller 115 outputs the system status signal 119 for system status control. Upon receipt of the bus disconnection request signal 120, the system status controller 115 generates the system status signal 119 indicating a bus disconnection state for output to the bus connection and disconnection unit 118. In response, the bus connection and disconnection unit 118 disconnects the ISA bus 106 from the SBUS 112. If an access cycle is generated from the CPU block 101 or from the bus master 107 on the ISA bus 106 to a device on the SBUS 112, the bus connection and disconnection unit 118 causes the access cycle from the ISA bus 106 to wait. If the SBUS access occurrence signal 121 is not generated when the bus disconnection request signal 120 is rendered inactive, the system status controller 115 changes a system state into a bus connection timing adjustment state. In this state, bus signals other than the command signal are connected, so that no illegal access cycle will occur on the SBUS 112 upon bus connection. If the SBUS access occurrence signal 121 is not generated in the bus connection timing adjustment state, the normal system state is restored. If the SBUS access occurrence signal 121 is generated when the bus disconnection request signal 120 is turned inactive or when the system is in the bus connection timing adjustment state, the system status controller 115 generates the system status signal 119 indicating a wait access execution state for output to the bus connection and disconnection unit 118. This causes the SBUS access cycle being put in a wait state on the ISA bus 106 to be executed on the SBUS 112. With the access cycle terminated, the normal system state is restored.

Second Embodiment

Figure 2:
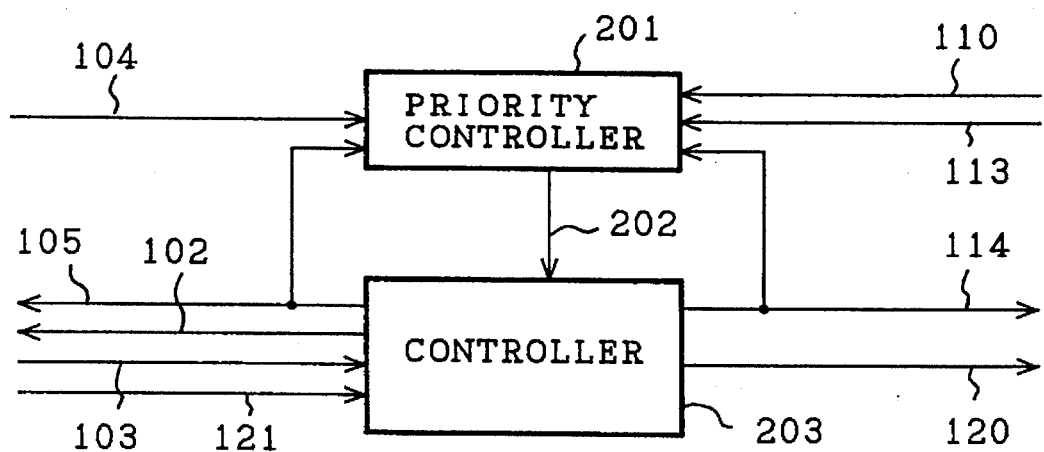
FIG. 2 is a block diagram of an arbitration unit practiced as a second embodiment of the invention.

FIG. 2 is a block diagram of an arbitration unit practiced as the second embodiment of the invention, the unit being used by the above-described computer system. In FIG. 2, reference numeral 201 is a priority controller that receives bus acquisition request signals 104 and 113 and a bus disconnection request signal 110 from the bus masters 107, 108 and 109 on the ISA bus 106 and SBUS 112 and selects the bus acquisition request of the highest priority; 202 is the bus acquisition request signal selected by the priority controller 201; and 203 is a controller that generates a signal to put the CPU block 101 on hold or a bus acquisition acknowledge signal upon receipt of the SBUS access occurrence signal 121 as well as the bus acquisition request signal 202 selected by the priority controller 201.

The arbitration unit of FIG. 2 works as follows. Suppose that, with the CPU 1011 of the CPU block 101 having acquired the bus connection, bus acquisition request signals 104 or 113 are generated by a plurality of bus masters or by slaves of the DMA controller 1012 in the CPU block 101. In that case, the bus acquisition request signals 104 and 113 and the bus acquisition acknowledge signals 105 and 114 are all initially inactive. In that state, turning a plurality of bus acquisition acknowledge signals 105 or 114 active causes the priority controller 201 to provide priority control in accordance with the following rule:

bus acquisition request without bus disconnection> CPU> bus acquisition request with bus disconnection    (1)

Under priority control of the priority controller 201, priorities are arranged according to the rule (1) above. The CPU 1011 is higher than a bus acquisition request with bus disconnection in priority only when the CPU 1011 generates an access cycle for access to a device on the SBUS 112. Bus acquisition requests occur at different levels which are also subject to priority control. Of the bus acquisition requests without bus disconnection, the one at the highest level is selected first. Where there is no bus acquisition request without bus disconnection or where bus acquisition requests without bus disconnection come from the ISA bus 106, the bus acquisition request with bus disconnection at the highest level may also be selected. If the selected bus acquisition request does not involve bus disconnection, the controller 203 generates the signal ISADRQx 102 to the CPU block 101. In turn, the controller 203 receives the signal $\overline{\text{ISADACKx}}$ 103 and renders active the bus acquisition acknowledge signal 105 or 114 at the corresponding level on the side of the bus on which is furnished the bus master generating the selected bus acquisition request. Where the selected bus acquisition request involves bus disconnection, the controller 203 turns the bus acquisition acknowledge signal 114 active at the level corresponding to the bus master 109 having acquired the bus without putting the CPU 1011 on hold. At the same time, the controller 203 generates the bus disconnection state request signal 120. If a bus acquisition request on the ISA bus 106 and a bus acquisition request with bus disconnection are both selected, the controller 203 puts the CPU 1011 on hold, generates bus acquisition acknowledge signals in response to the two bus acquisition requests, and generates the bus disconnection state request signal 120.

Third Embodiment

Figure 3:
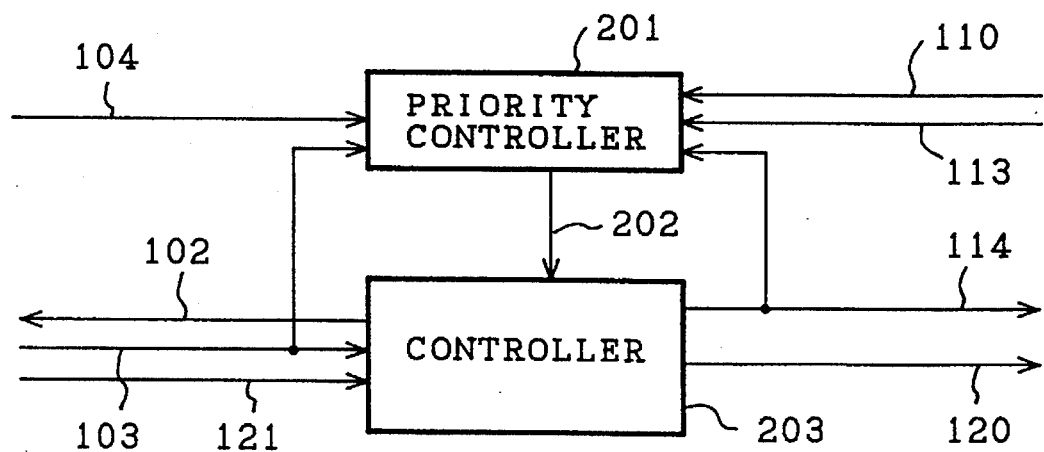
FIG. 3 is a block diagram of another arbitration unit practiced as a third embodiment of the invention.
Figure 4:
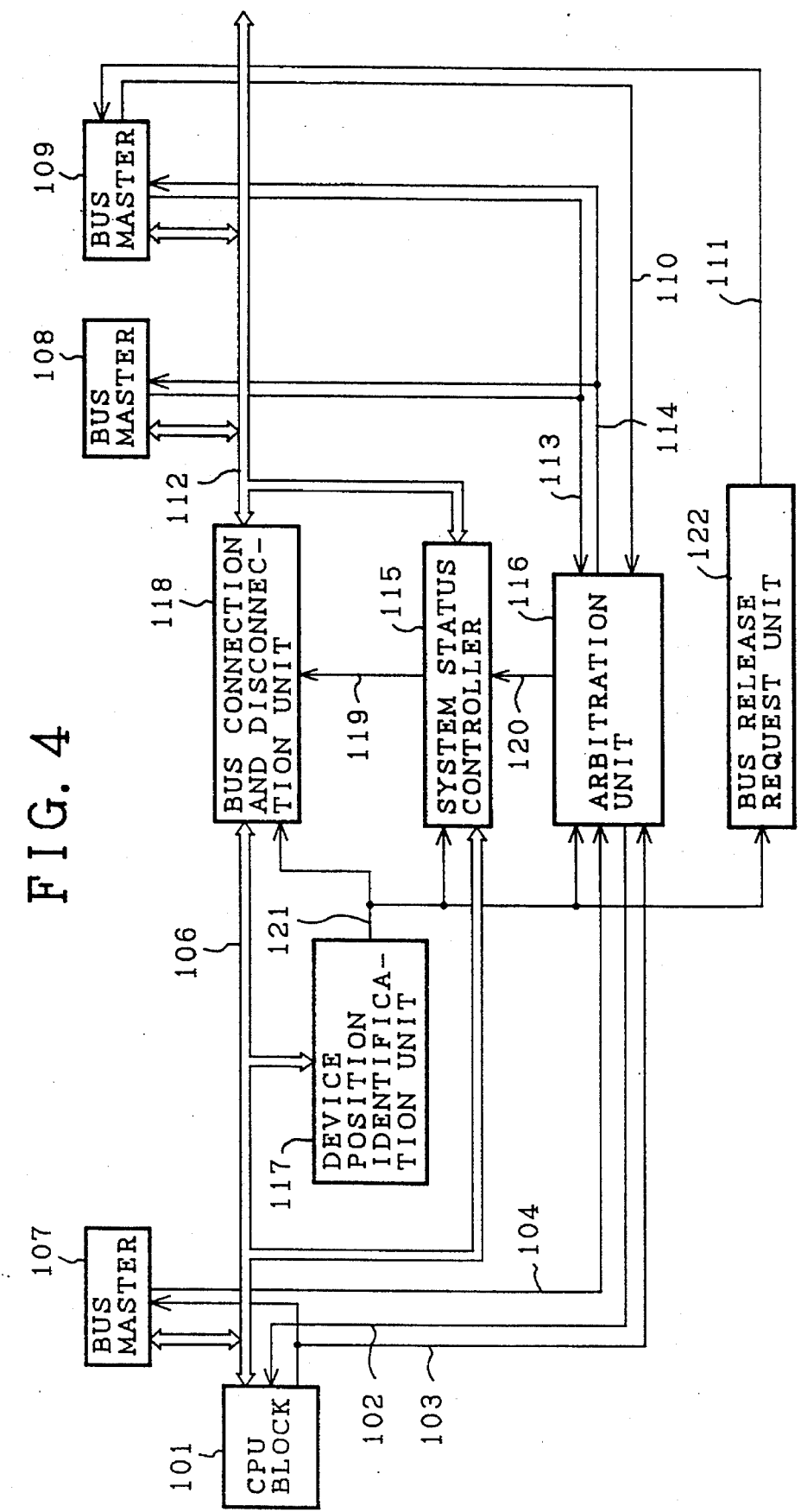
FIG. 4 is a block diagram of a computer system containing the arbitration unit of FIG. 2 or 3.

FIGS. 3 and 4 illustrate variations of the first embodiment described above. FIG. 3 is a block diagram of an arbitration unit practiced as the third embodiment of the invention, and FIG. 4 is a block diagram of a computer system containing the arbitration unit of FIG. 2 or 3. With the third embodiment, the signal $\overline{\text{ISADACKx}}$ 103 is also used as the signal $\overline{\text{MDACKx}}$ 105. In this case, the workings involved are the same as those of the first embodiment except that the controller 203 need not output the signal $\overline{\text{MDACKx}}$.

Fourth Embodiment

Figure 5:
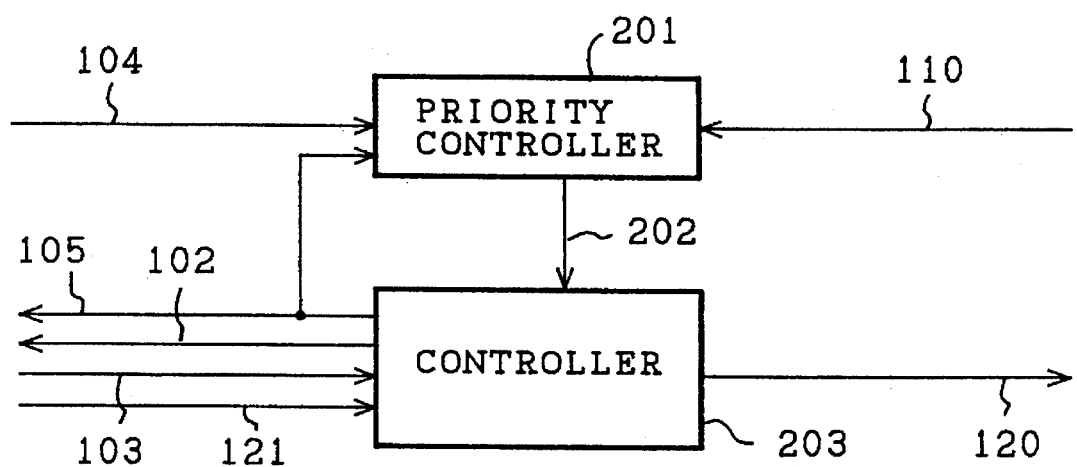
FIG. 5 is a block diagram of another arbitration unit practiced as a fourth embodiment of the invention.
Figure 6:
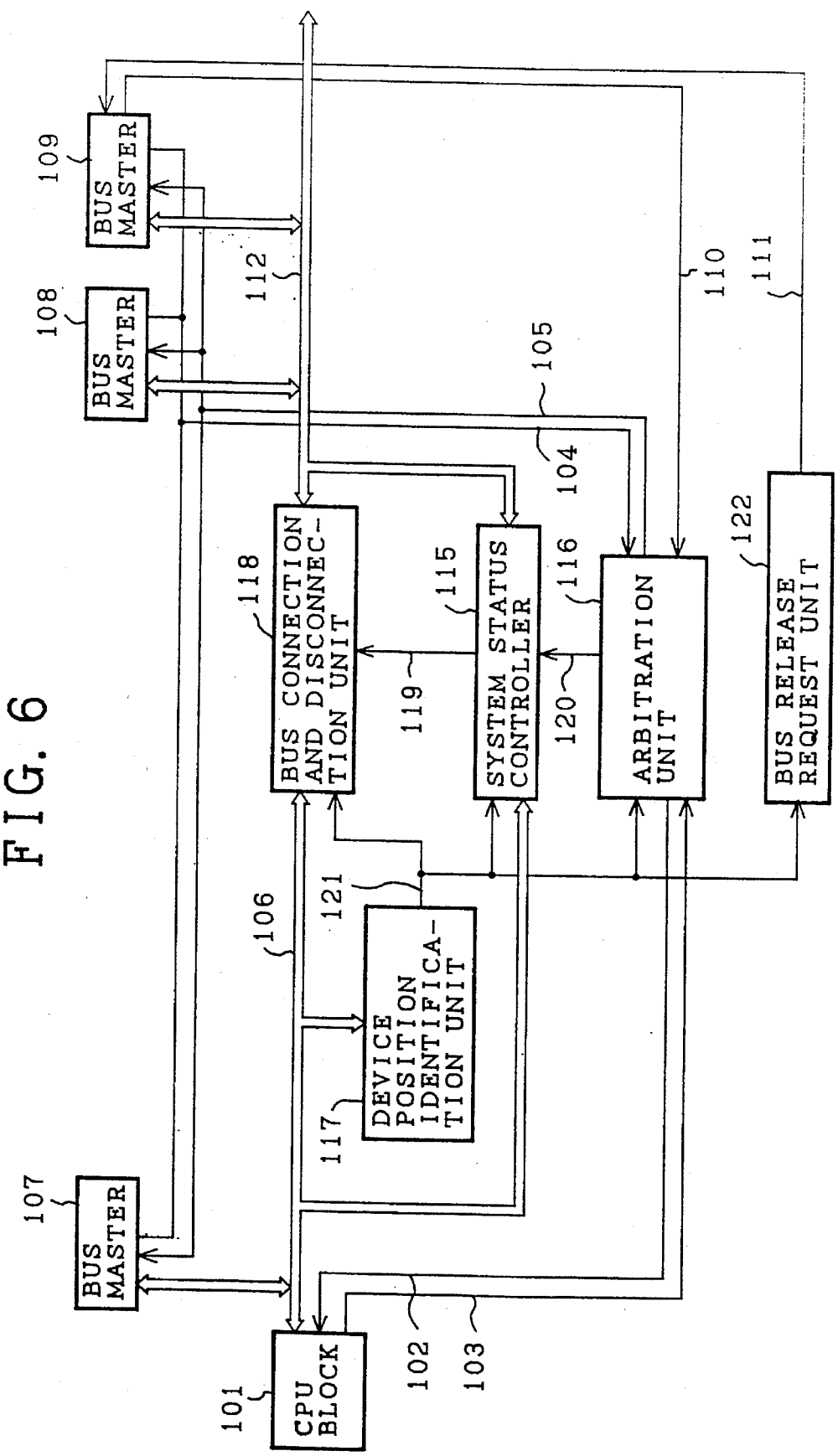
FIG. 6 is a block diagram of a computer system containing the arbitration unit of FIG. 5.

Other variations of the first embodiment are shown in FIGS. 5 and 6. FIG. 5 is a block diagram of an arbitration unit practiced as the fourth embodiment of the invention, and FIG. 6 is a block diagram of a computer system containing the arbitration unit of FIG. 5. With the fourth embodiment, if the level of a bus acquisition request used on the ISA bus side is known, the signals $\overline{\text{MDRQx}}$ 104 and $\overline{\text{MDACKx}}$ 105 may be used respectively as the bus acquisition request signal 113 and bus acquisition acknowledge signal 114 for the SBUS. The priority controller 201 and controller 203 store in advance the levels of bus acquisition requests used on the ISA bus. When a bus acquisition request of any allowable level is generated, that request is processed as one from the ISA bus.

Fifth Embodiment

Figure 7:
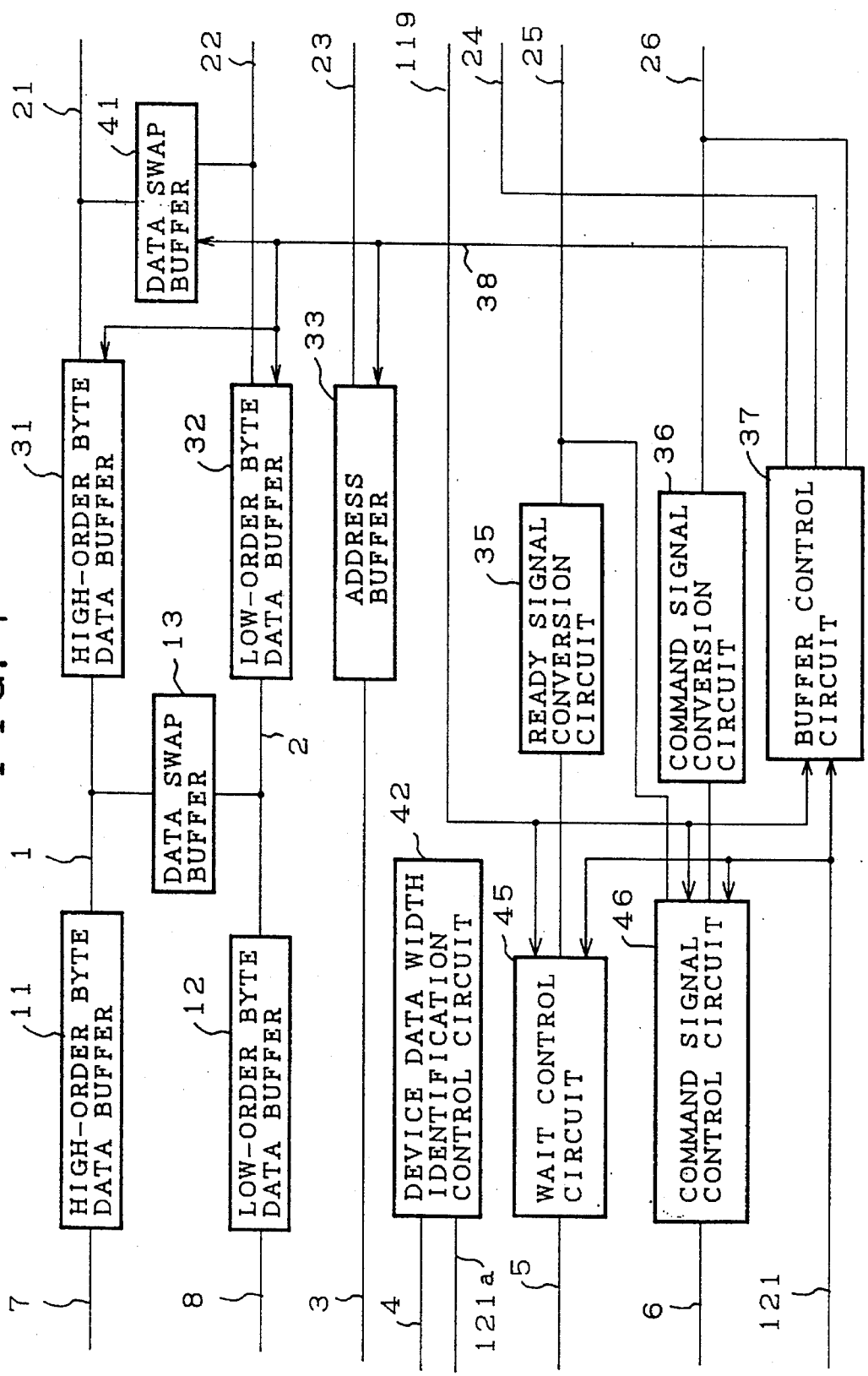
FIG. 7 is a block diagram of a bus connection and disconnection unit practiced as a fifth embodiment of the invention.
Figure 12:
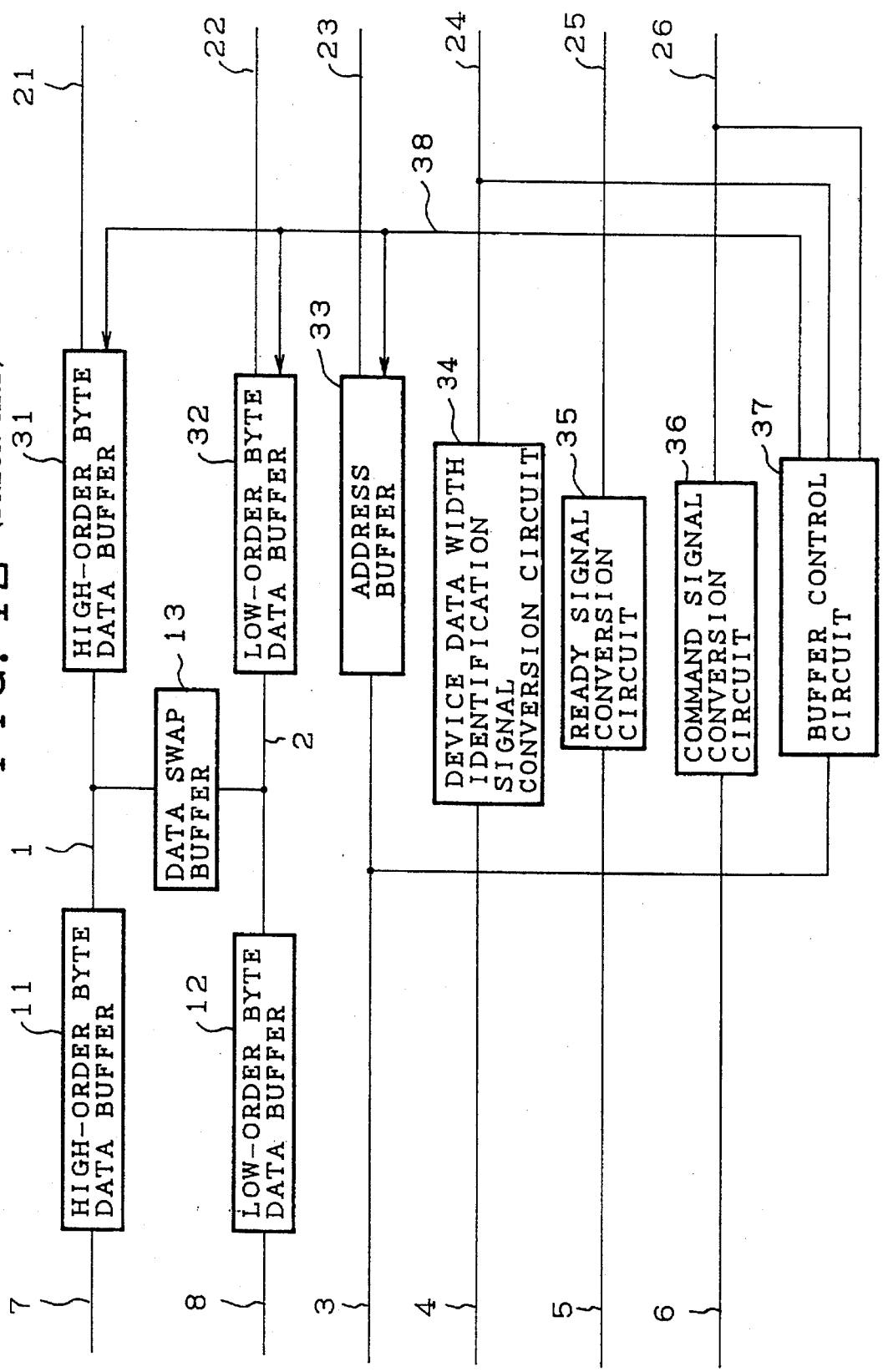
FIG. 12 is a block diagram of a prior art bus connection and disconnection unit.

FIG. 7 is a block diagram of a bus connection and disconnection unit practiced as the fifth embodiment of the invention, the unit being used in conjunction with the first, second or third embodiment described above. In describing the fifth embodiment, the component parts common to FIG. 12 are designated by common reference numerals, and the descriptions of the common parts are omitted here to avoid unnecessary repetition. In FIG. 7, reference numeral 41 is a data swap buffer that swaps data between high-order byte data bus 21 and low-order byte data bus 22 on the SBUS; and 121*a* is a variation of the SBUS access occurrence signal 121, generated by the device position identification unit 117. The signal 121a is a SBUS access auxiliary signal that is rendered active when the current address on the ISA bus is found to be one for access to the SBUS upon comparison with the addresses held in the device position identification unit 117.

Reference numeral 42 is a device data width identification signal control circuit that renders the device data width identification signal 4 active on the ISA bus upon recognizing the possibility of access from the ISA system to the SBUS following the SBUS access auxiliary signal 121a being rendered active. Reference numeral 45 is a wait control circuit that controls the access wait state by suitably controlling the ready signal 5 on the ISA bus in accordance with the system status signal 119 and SBUS access occurrence signal 121. Reference numeral 46 is a command signal control circuit that controls the command signal 26 on the SBUS also in accordance with the system status signal 119 and SBUS access occurrence signal 121.

The low-order byte data buffer 32 differs from its apparent counterpart in FIG. 12 in that the former is equipped with a latch function. Likewise the buffer control circuit 37 is different from its apparent counterpart in FIG. 12 in that the circuit 37 generates the control signal 38 based on the system status signal 119, on the SBUS access occurrence signal 121, on the device data width identification signal 24 of the SBUS and on the command signal 26 of the SBUS. The control signal 38 is used to control the high-order byte data buffer 31, low-order byte data buffer 32, address buffer 33 and data swap buffer 41.

What follows is a description of how the bus connection and disconnection unit practiced as the fifth embodiment works. Described first is how the ready signal 5 of the ISA bus is processed upon access by the ISA system to a device on the SBUS. When the system status is isolated from bus disconnection, an access cycle generated by the ISA system for access to a device on the SBUS causes the ready signal of the SBUS to be converted into the ready signal 5 of the ISA system. There is a case where bus disconnection requested by a bus master makes it impossible for access from the ISA system to a device on the SBUS to be immediately executed on the SBUS. Such a case is recognized by the wait control circuit 45 using the system status signal 119; the wait control circuit 45 renders the ready signal 5 of the ISA bus inactive to put the access cycle on the ISA bus in wait state. When the access by the ISA system to the SBUS is made possible illustratively by a bus master's releasing the SBUS, the wait control circuit 45 outputs the ready signal 5 of the ISA bus in accordance with the SBUS ready signal 25 output by the device to be accessed, until that target device becomes available for the access.

The processing of the device data width identification signal 4 for the ISA bus takes place as follows. When the SBUS access auxiliary signal 121a is rendered active, the device data width identification signal control circuit 42 recognizes a possibility of access to a device on the SBUS. Then the circuit 42 turns the device data width identification signal 4 active on the ISA bus regardless of the actual data width of the device to be accessed on the SBUS, and requests the ISA system to permit an access cycle for access to a 16-bit device.

For byte access to a 16-bit device with an even-number address on the ISA bus, the low-order byte data bus 2 is used for data transfer; for access to a 16-bit device with an odd-number address over the ISA bus, the high-order byte data bus 1 is used for data transfer. In response, the buffer control circuit 37 turns on the low-order byte data buffer 32 upon even-number address access and the high-order byte data buffer 31 upon odd-number address access for execution of the access cycle on the SBUS. For word access to a 16-bit device, both the high-order byte data bus 1 and the low-order byte data bus 2 are used for data transfer on the ISA bus. In response, the buffer control circuit 37 turns on both the high-order byte data buffer 31 and the low-order byte data buffer 32 to execute the access cycle on the SBUS.

For byte access to an 8-bit device, what takes place is the same as in byte access to the 16-bit device on the ISA bus. This is because the device data width identification signal control circuit 42 keeps active the device data width identification signal 4 of the ISA bus regardless of the actual data width of the device to be accessed. Thus the buffer control circuit 37 turns on the low-order byte data buffer 32 upon even-number address access in order to execute the access cycle on the SBUS. For odd-number address access, the buffer control circuit 37 turns on the high-order byte data buffer 31 and data swap buffer 41 and connects the low-order byte data bus 22 on the SBUS with the high-order byte data bus 1 on the ISA bus to execute the access cycle on the SBUS.

For word access to an 8-bit device, what takes place is the same as in word access to the 16-bit device on the ISA bus. On the SBUS, two cycles of low-order byte data access are carried out. The bus connection and disconnection unit located between the ISA bus and the SBUS maintains access consistency therebetween as follows. For read access, the first access cycle latches the byte data of the even-number address on the SBUS into the low-order byte data buffer 32; the second access cycle causes the data latched in the low-order byte data buffer 32 to be output to the low-order byte data bus 2 on the ISA bus and turns on both the high-order byte data buffer 31 and the data swap buffer 41. The byte data of the odd-number address on the SBUS are output to the high-order byte data bus 1 on the ISA bus, and the ISA system executes word access. For write access, the first access cycle turns on the low-order byte data buffer 32, and outputs the low-order byte data on the ISA bus to the low-order byte data bus 22 on the SBUS for writing into the even-number address device. The second access cycle turns on the high-order byte data buffer 31 and data swap buffer 41, and outputs the high-order byte data on the ISA bus side to the low-order byte data bus 22 on the SBUS for writing into the odd-number address device.

Those buffers not described in connection with the high-order byte data buffer 31, low-order byte data buffer 32 and data swap buffer 41 in the above-described access operations are turned off by the buffer control circuit 37. The high-order byte data buffer 31 and low-order byte data buffer 32 are held on except when the system is in bus disconnection state. This is to prepare for access from the ISA system to any device on the SBUS. While the system is in bus disconnection state, the buffers 31, 32 and 41 are turned off. The address buffer 33 is turned off only if the system is in bus disconnection state or remains on in other states.

The processing of the command signal 26 on the SBUS will now be described. When the system status is isolated from bus disconnection or from bus acquisition by a bus master on the SBUS, the command signal 26 on the SBUS works in the same manner as the command signal 6 on the ISA bus under control of the command signal control circuit 46. This prepares for the access by the ISA system to any device on the SBUS. When the system is in bus disconnection state or in bus connection timing adjustment state, the command signal 6 of the ISA bus is separated from the command signal 26 of the SBUS. For processing of an access cycle which is generated by the ISA system upon bus disconnection and held in wait state for access to the SBUS, the command signal control circuit 46 suitably times the command signal 26 for the SBUS. When the ISA system accesses a device on the SBUS, the command signal 26 of the SBUS and the command signal 6 of the ISA bus are made to operate in the same manner except when the access is word access to an 8-bit device. For word access to an 8-bit device, the command signal control circuit 46 detects the ready signal 25 of the SBUS and renders inactive the command signal 26 on the SBUS upon completion of the byte access to the even-number address. The command signal control circuit 46 then turns the command signal 26 active at the timing necessary for the byte access to the odd-number address on the SBUS. The access cycle of the SBUS is terminated upon completion of the access cycle on the ISA bus.

Sixth Embodiment

Described in connection with the fifth embodiment is the case in which the low-order byte data buffer 32 connecting the low-order byte data bus 2 of the ISA bus with the low-order byte data bus 22 of the SBUS is equipped with a latch capability. Alternatively, the low-order byte data buffer 32 may simply be a buffer with no latch function. Instead, the data swap buffer 41 swapping data between high-order byte data bus 21 and low-order byte data bus 22 of the SBUS is equipped with a latch capability. The bus connection and disconnection unit of this case is the same in constitution as that of the fifth embodiment in FIG. 7.

What follows is a description of the workings of the bus connection and disconnection unit practiced in the above manner as the sixth embodiment. The description will begin with the processing of the device data width identification signal 4 on the ISA bus; the processing of the ready signal 5 on the ISA bus is the same as with the fifth embodiment and will thus be omitted. The device data width identification signal control circuit 42 first recognizes a possibility of access to a device on the SBUS on the basis of the SBUS access auxiliary signal 121*a* received. In that case, the device data width identification signal control circuit 42 renders inactive the device data width identification signal 4 of the ISA bus regardless of the actual data width of the device to be accessed on the SBUS, and requests the ISA system to permit an access cycle to an 8-bit device.

In the case of byte access to a 16-bit device, the low-order byte data bus 2 is used for data transfer for both even-number and odd-number address access on the ISA bus. Thus the buffer control circuit 37 turns on the low-order byte data buffer 32 to execute even-number address access. To execute odd-number address access, the buffer control circuit 37 turns on both the low-order byte data buffer 32 and the bus swap buffer 41 so that the low-order byte data bus 2 on the ISA bus will be connected with the high-order byte data bus 21 on the SBUS.

For word access to a 16-bit device, the low-order byte data bus 2 is used to execute two byte access cycles on the ISA bus. On the SBUS, one word access cycle is performed. The bus connection and disconnection unit located between the ISA bus and the SBUS maintains access consistency therebetween as follows. For read access, the first access cycle latches the high-order byte data on the SBUS into the data swap buffer 41, and turns on the low-order byte data buffer 32. This allow the ISA system to read the low-order byte data on the SBUS as even-number address data. At this point, the data swap buffer 41 performs data latch alone and does not effect any output. The second access cycle causes the data latched in the data swap buffer 41 to be output through the low-order byte data buffer 32. The output data are read as odd-number address data from the low-order byte data bus on the ISA bus. On the SBUS, at this time, only the latched data are output and no command is output. For write access, the first access cycle outputs even-number address data onto the low-order byte data bus 2 on the ISA bus and odd-number address data onto the high-order byte data bus 1 also on the ISA bus side. Thus the high-order byte data buffer 31 and low-order byte data buffer 32 are turned on to let the even-number address data be output onto the low-order byte data bus 22 on the SBUS and the odd-number address data onto the high-order byte data bus 21 also on the SBUS for write access execution. The second access cycle on the ISA bus side is ignored.

For byte access to an 8-bit device, the low-order byte data buffer 32 is turned on. For word access to an 8-bit device, two low-order byte access cycles are carried out on the ISA bus as with the case of word access to a 16-bit device. The buffer control circuit 37 also performs two low-order byte access cycles on the SBUS by turning on the low-order byte data buffer 32.

Those buffers not described in connection with the high-order byte data buffer 31, low-order byte data buffer 32 and data swap buffer 41 in the above-described access operations are turned off by the buffer control circuit 37. The high-order byte data buffer 31 and low-order byte data buffer 32 are held on except when the system is in bus disconnection state. This is to prepare for access from the ISA system to any device on the SBUS. While the system is in bus disconnection state, the buffers 31, 32 and 41 are turned off. The address buffer 33 is controlled in the same manner as with the fifth embodiment.

The processing of the command signal 26 on the SBUS will now be described. Because the command signal 26 on the SBUS is controlled in the same manner as with the fifth embodiment on the basis of the system status, the description of the signal 26 in that respect is thus omitted. What is described here is how the command signal 26 on the SBUS is controlled by access type. Upon access by the ISA system to a device on the SBUS, the command signal 26 of the SBUS and the command signal 6 of the ISA bus have the same meaning in operation except for word access to a 16-bit device. For word access to a 16-bit device, the command signal control circuit 46 renders inactive the command signal 26 of the SBUS upon completion of the first byte access cycle on the ISA bus, thereby terminating the access cycle on the SBUS. In the second byte access cycle on the ISA bus, the command signal 26 of the SBUS is kept inactive.

With the fifth and sixth embodiments above, there is a case where the timing for driving the device data width identification signal 24 of the SBUS connected to the ISA bus is consistent with the timing for reading the device data width identification signal 4 of the ISA bus. In that case, there may occur an access cycle for access from the ISA system to a device on the SBUS, with the system status isolated from bus disconnection. This makes it possible to turn the device data width identification signal 24 of the SBUS into the device data width identification signal 4 of the ISA bus for execution of the access cycle consistent with the actual device data width. At this point, the cycle contents on the ISA bus are made the same as those on the SBUS. Of the high-order byte data buffer 31 and low-order byte data buffer 32, only the necessary buffer needs to be turned on.

Seventh Embodiment

With the fifth and sixth embodiments described above, the system has no specific considerations for the generation of access cycles from a bus master on the SBUS to the ISA bus. What follows is a description of a system practiced as the seventh embodiment allowing for such access cycles. With the seventh embodiment, the MBUS and the SBUS are each an ISA bus. It is assumed that the SBUS has a bus master that gains access to a device on the MBUS. It is also assumed that the constitution of the bus connection and disconnection unit is basically the same as that in FIG. 7. However, the unit of the seventh embodiment is enhanced in such a manner that the address buffer 33, ready signal conversion circuit 35 and command signal conversion circuit 36 each act as a bidirectional type and that the buffer control circuit 37 supports bidirectional access.

A bus master on the SBUS gains access to the MBUS as follows. In this case, the CPU must be put on hold until an access cycle is started on the MBUS. If delays attributable to the buffers and conversion circuits between MBUS and SBUS are sufficiently short, the device data width identification signal 24 and ready signal 25 for the SBUS are made available by simply buffering the signals 4 and 5 on the MBUS for output to the SBUS. Likewise the command signal 6 for the MBUS is made available by simply buffering the command signal 26 on the SBUS for output to the MBUS. In addition, data consistency is ensured through control over buffer directivity, i.e., by suitably toggling the data buffers 31 and 32 to enable the data bus that conforms to the access data width as well as to the device data width of the device to be accessed. If delay time attributable to the buffers and conversion circuits is long, the same units as with the fifth and sixth embodiments are required on the SBUS. The address buffer 33 is directed from the SBUS to the MBUS.

A bus master on the SBUS accesses a device on the same bus as follows. To execute this kind of access requires that the bus master first acquire the SBUS and then turn off the data buffers 31 and 32, the address buffer 33 and the control signal buffers. With the data buffers 31 and 33 turned off, the data swap function does not work on the SBUS. This means that the data swap function of the ISA system needs to be emulated by toggling the data swap buffer 41 suitably according to the access data width and the device data width of the device to be accessed. The address buffer 33 is either directed from the SBUS to the MBUS, or turned off in bus disconnection state.

Eighth Embodiment

Figure 8:
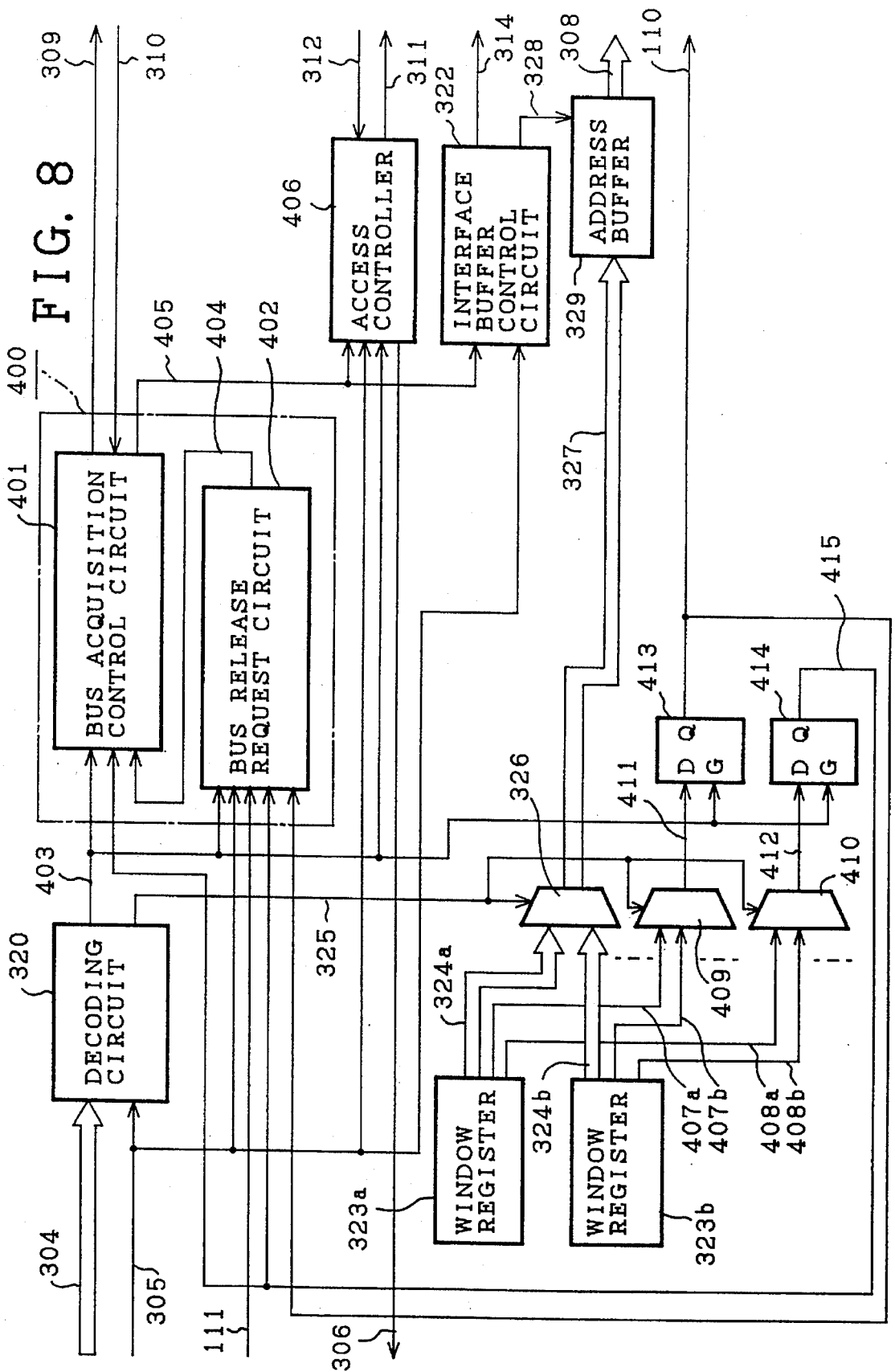
FIG. 8 is a block diagram of a bus master system interface practiced as an eighth embodiment of the invention.
Figure 9:
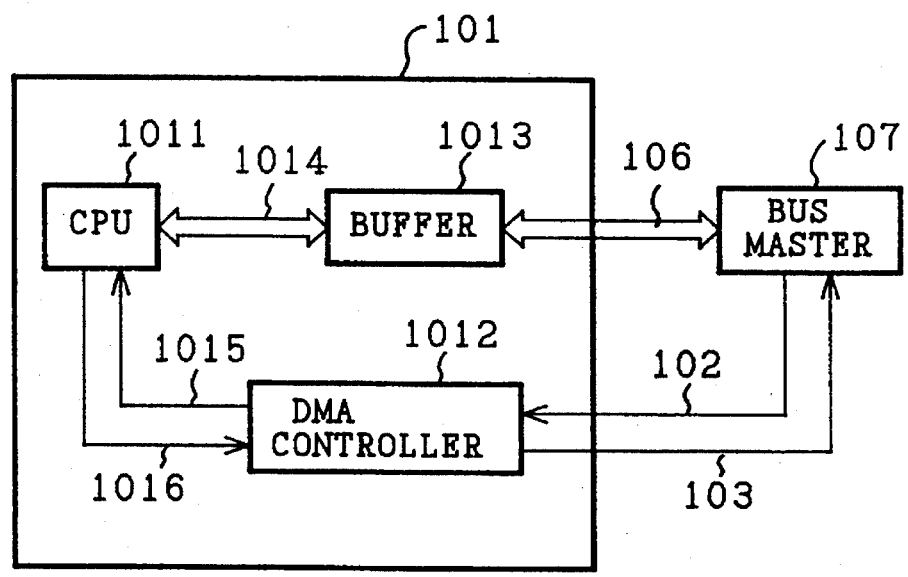
FIG. 9 is a block diagram of a prior art computer system.
Figure 10:
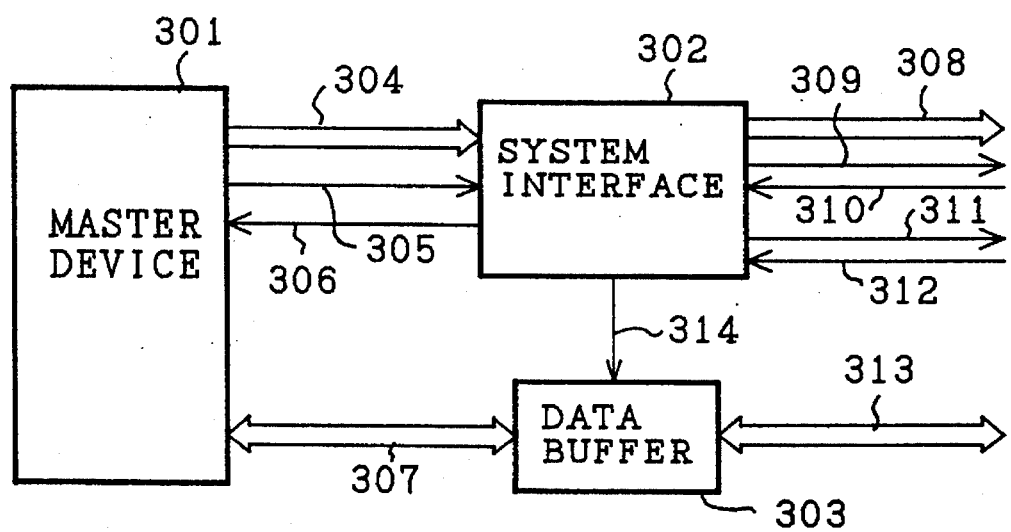
FIG. 10 is a block diagram of a prior art bus master.
Figure 11:
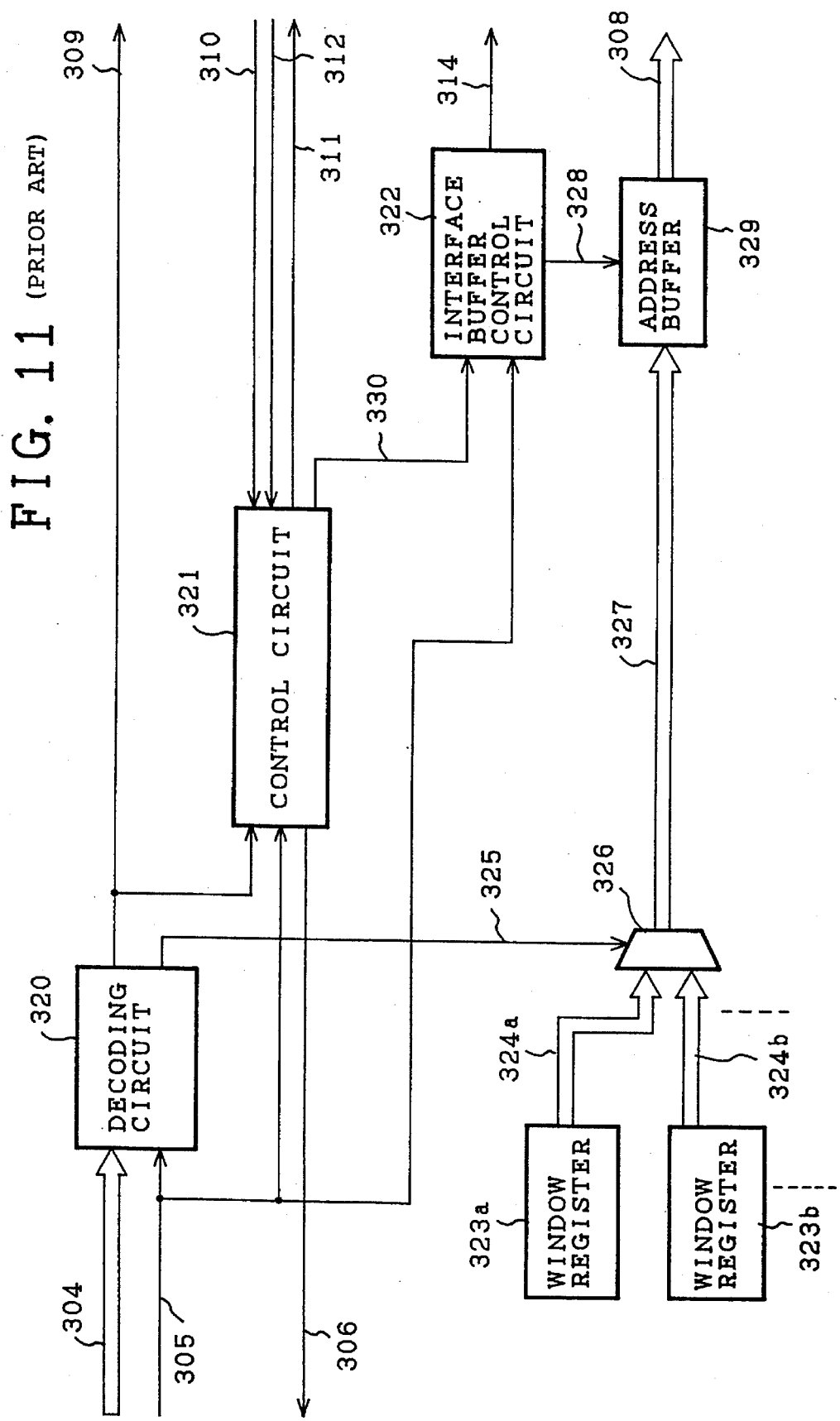
FIG. 11 is a block diagram of a prior art bus master system interface.

FIG. 8 is a block diagram of a variation of the prior art system interface 302 in FIG. 10, the variation being practiced as the eighth embodiment of the invention. With the eighth embodiment, a continuous bus acquisition request signal is used to implement a function that allows a bus master continuously to access a bus once that bus is acquired. In FIG. 8, reference numeral 400 is a bus acquisition request unit that supports bus disconnection; 401 is a bus acquisition control circuit; 402 is a bus release request circuit; 403 is a system access request signal; 404 is a bus release request signal; 405 is a bus acquisition notice signal; and 406 is an access controller that controls bus access using the system access request signal 403, bus acquisition notice signal 405 and a command signal 305 from a master device 301.

Reference numerals 407a, 407b, etc. are bus disconnection request bits stored in window registers 323a, 323b, etc.; 408a, 408b, etc. are continuous bus acquisition request bits stored in the window registers 323a, 323b, etc.; 409 is a multiplexer for selecting a bus disconnection request bit; 410 is a multiplexer for selecting a continuous bus acquisition request bit; 411 is the bus disconnection request bit selected by the multiplexer 409; 412 is the continuous bus acquisition request bit selected by he multiplexer 410; 413 is a bus disconnection request signal latch circuit acting as a bus disconnection request unit that outputs the bus disconnection request signal 110 by latching the selected bus disconnection request bit 411; 414 is a continuous bus acquisition request signal latch circuit for latching the selected continuous bus acquisition request bit 412; and 415 is a continuous bus acquisition request signal output by the latch circuit 414. Since the other component parts have already been discussed, they will not be described here again.

It should be noted that the bus disconnection and bus release features are implemented only if the bus disconnection request signal 110 and bus release request signal 111 described above are connected.

The eighth embodiment works as follows. As with its prior art counterpart, this system interface has a plurality of system access windows in its address space. The bank addresses of the windows are programmed beforehand in the window registers 323a, 323b, etc. The window registers 323a, 323b, etc. have a bus disconnection request bit and a continuous bus acquisition request bit each. Thus it is possible to store a bus disconnection request or a continuous bus acquisition request for access to the extended bus of the system through each window. When the master bus 301 generates an access request to any one of the windows, the decoding circuit 320 decodes that access request to drive the system access request signal 403 and window selection signal 325. The multiplexers 326, 409 and 410 select the window register designated by the window selection signal 325, and output the register contents to the bank address 327, bus disconnection request bit 411 and continuous bus acquisition request bit 412. The latch circuits 413 and 414 take the system access request signal 403 as their gate signals. Every time the master device 301 generates an access request to the system, the latch circuits 413 and 414 latch the bus disconnection request bit 411 and continuous bus acquisition bit 412 and output the bus disconnection request signal 110 and continuous bus acquisition request signal 415.

Suppose that the decoding circuit 320 generates the system access request signal 403 when the bus master having the above system interface (eighth embodiment) has not acquired a bus connection and that the release request circuit 402 does not output the bus release request signal 404. In that case, the bus acquisition control circuit 401 outputs the bus acquisition request signal 309 to the system. When the system has released the bus and outputs the bus acquisition acknowledge signal 410 to the bus master, the bus acquisition control circuit 401 outputs the bus acquisition notice signal 405. This causes the access controller 406 and interface buffer control circuit 322 to execute the access cycle on the extended bus of the system. When the system access request signal 403 is generated and the bus acquisition notice signal 405 is not generated, the access controller 406 renders the ready signal 306 of the master device inactive to put the access by the master device in a wait state. Thereafter, the generation of the bus acquisition notice signal 405 causes the access controller 406 to drive the command signal 311 of the system at the necessary timing. At this point, the interface buffer control circuit 322 outputs the data buffer control signal 314 and address buffer control signal 328 to let the access cycle be executed on the extended bus of the system. When the device to be accessed is ready to respond, the access controller 406 outputs the status of the system ready signal 312 as the ready signal 306 to the master device 301, thereby notifying the device 301 of the completion of the access.

With the access completed and the system access request signal 403 rendered inactive, the bus acquisition control circuit 401 releases the bus by turning inactive the bus acquisition request signal 309 of the system, provided that the bus release request signal 404 is being output by the bus release request circuit 402 or that the continuous bus acquisition request signal 415 is not output by the continuous bus acquisition request signal latch circuit 414. If the bus release request signal 404 is not output and if the continuous bus acquisition request signal 415 is output, the bus acquisition control circuit 401 continues to output the bus acquisition request signal 309 of the system in preparation for the next access to the extended bus of the system. If no access occurs to the extended bus of the system upon elapse of a predetermined period of time, the bus acquisition control circuit 401 releases the bus by automatically turning the bus acquisition request signal 309 of the system inactive. Upon receipt of the bus release request signal 111 from the system, the bus release request circuit 402 outputs the bus release request signal 404 to request the bus acquisition control circuit 401 to release the bus.

Where the next bus access goes through a window different from the one for the current bus access, the status of the bus disconnection request bit 411 and that of the continuous bus acquisition request bit 412 may change. In such a case, the bus release request circuit 402 outputs the bus release request signal 404 to request that the bus be released before the next bus access is executed on the extended bus of the system. On receiving the bus release request signal 404, the bus acquisition control circuit 401 releases the bus and then acquires it again before executing the next bus access.

As described, the computer system according to the invention is constituted of the system status control unit, arbitration unit, device position identification unit, and bus connection and disconnection unit, each unit being implemented in a general computer. This constitution keeps the CPU from getting put on hold while the bus master is acquiring one of the two buses through their disconnection. That is, the general system architecture of the computer system is kept intact while the performance and flexibility of the system are significantly enhanced.

Addition of the bus release request unit to the computer system prevents the bus master from continuously acquiring the SBUS after bus disconnection by ignoring the attempt by the CPU to access the SBUS. This also contributes to improving the system performance.

The computer system according to the invention has its arbitration unit supplemented with the priority control feature as well as the control feature covering, among others, bus acquisition requests involving bus disconnection. The arrangement allows the CPU and bus master to perform parallel bus access, whereby the system performance is improved without reorganizing the general system architecture.

Furthermore, the computer system according to the invention has the data swap function added to the data buffer between MBUS and SBUS. Also added to the buffer is the device data width identification signal control circuit that detects the SBUS access reserve signal to control the device data width identification signal for the MBUS. The arrangement allows the system connected with the MBUS to gain access to a 16-bit device on the MBUS. When there is detected a possibility of access to a device on the SBUS, the device data width identification signal for the MBUS is activated. This permits access to the device on the SBUS for which the device data width identification signal is slow to be activated. That is, the system connected with the MBUS may access a device whose specifications are different from those of the MBUS.

The computer system according to the invention recognizes the status of the SBUS by detecting the system status signal. This allows the system connected with the MBUS to access a device on the SBUS after the bus master has released the SBUS. The arrangement provides for a multiple bus master configuration.

While preferred embodiments of the invention have been described using specific terms, such description is for illustrative purposes only, and it is to be understood that changes and variations may be made without departing from the spirit or scope of the following claims.

What is claimed is:

1. A computer system comprising:

a processor for executing processes constituting principal operations of said computer system;

a first bus connected to said processor;

a first bus master for executing predetermined processes;

a second bus connected to said first bus master;

bus connection and disconnection means for connecting and disconnecting said first bus to and from said second bus; and bus connection and disconnection control means connected to said bus connection and disconnection means for causing said bus connection and disconnection means to disconnect said first bus from said second bus when said first bus master requests acquisition of said second bus in parallel to a request from said processor such that said processor stays operational;

wherein said bus connection and disconnection means includes:

an address buffer for connecting an address bus of said first bus with an address bus of said second bus;

a high-order data buffer for connecting a high-order byte data bus of said first bus with a high-order byte data bus of said second bus;

a low-order byte data buffer for connecting a low-order byte data bus of said first bus with a low-order byte data bus of said second bus;

a swap buffer for swapping data between the high-order byte data bus of said second bus and low-order byte data bus of said second bus; and buffer control means for converting a number of data bits between said first bus and said second bus through control over said address buffer, said high-order byte data buffer, said low-order byte data buffer and said swap buffer; and wherein when said processor or said first bus master makes an access to a device connected to said second bus, said bus connection and disconnection means sets in advance of the access a predetermined data width on a first data width identification signal regardless of an actual access data width of said device, and then said buffer control means is controlled based on the first data width identification signal and a second data width identification signal of said second bus such that data transfer is performed in a desired order even if a number of access bits of the device is different from said predetermined data width, said first data width identification signal indicating a number of bits which is recognized on the side of said first bus as a processing unit of bits, said second data width identification signal indicating a number of bits which the device processes at a time.

2. A computer system according to claim 1, wherein said bus connection and disconnection control means includes arbitration means for determining which is allowed between a bus acquisition request made by said processor and a bus acquisition request made by said first bus master based on respective levels of the bus requests.

3. A computer system according to claim 2, wherein said bus connection and disconnection control means includes system status control means for changing a status of said computer system in accordance with the bus acquisition request determined by said arbitration means.

4. A computer system according to claim 3, further comprising device position determining means, which stores addresses of devices on said first bus and said second bus, for determining which of said first bus and said second bus is connected to a device corresponding to an address accessed from said first bus.

5. A computer system according to claim 4, wherein said first bus is an industrial standard architecture bus.

6. A computer system according to claim 2, wherein said arbitration means performs arbitration of bus acquisition requests in accordance with a predetermined rule on bus acquisition priorities.

7. A computer system according to claim 1, further comprising ready signal control means for performing a wait control of a ready signal to be sent to said first bus when said first bus generates an access to said second bus.

8. A computer system according to claim 1, wherein said second bus is connected to devices and said first bus master includes:

a memory which stores data indicating whether bus disconnection requests from the devices are made or not, respectively, when said first bus master accesses the devices;

bus disconnection request means for requesting said bus connection and disconnection means to disconnect said first bus from said second bus when the buses are to be disconnected by referring to the data when said first bus master accesses a device out of the devices; and bus acquisition request means, if said first bus master attempts an access to a device on said second bus and if data corresponding to the device is different from data corresponding a previously accessed device, for causing a currently acquired bus to be released while said access is placed in wait state, and for generating a bus acquisition request for acquiring said second bus thereafter.

9. A computer system according to claim 8, wherein said bus acquisition request means cancels said bus acquisition request if a bus release request is issued.

10. A computer system according to claim 1, wherein said first bus is connected to a second bus master.

* * * * *